(12) United States Patent
Cok et al.

(10) Patent No.: US 6,285,468 B1
(45) Date of Patent: Sep. 4, 2001

(54) METHOD OF COMBINING TWO DIGITAL IMAGES

(75) Inventors: Ronald Steven Cok; John Randall Fredlund, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 593 days.

(21) Appl. No.: 08/681,653

(22) Filed: Jul. 29, 1996

(51) Int. Cl.$^7$ ............................................. H04N 1/40
(52) U.S. Cl. ............................................. 358/450; 358/453
(58) Field of Search ..................................... 358/450, 448, 358/453, 467; 382/112, 113, 165, 170, 190; 395/109, 129, 130, 131, 132, 117, 135

(56) References Cited

U.S. PATENT DOCUMENTS 4,903,141 * 2/1990 Morton et al. ..................... 358/448
5,459,819 * 10/1995 Watkins ............................. 395/117

* cited by examiner

Primary Examiner—Jerome Grant, II
(74) Attorney, Agent, or Firm—Frank Pincelli; David A. Novais

(57) ABSTRACT

A method of combining at least one captured generated digital image with at least one prestored digital image. The method includes analyzing a customer generated digital image so as to obtain a design attribute and/or style, then selecting a prestored digital image in accordance with the design attribute and/or style obtained and combining the customer generated image and the selected prestored digital image so as to form a merged image. The merged image is then forwarded to an output device.

15 Claims, 6 Drawing Sheets

(4 of 6 Drawing Sheet(s) Filed in Color)

METHOD OF COMBINING TWO DIGITAL IMAGES

FIELD OF THE INVENTION

This is directed to a system and method for producing customized images and merging at least two images obtained from different sources and printing the images on at least one output format.

BACKGROUND OF THE INVENTION

It is known from U.S. Pat. No. 5,459,819 to combine two digital images so as to form a single new merged digital image. Typically, this is done by an operator who's time is relatively expensive working with equipment which is also relatively expensive. Thus, it is important to minimize the amount of time the operator spends per customer order. It is possible that when the two images are combined together, an overall undesirable aesthetic effect will result. For example, the combined image sometimes has the appearance of having been made by cutting and pasting the images together. This visual effect can be particularly evident when particular combinations of prestored images are merged with customer generated images. Thus, in order to avoid this, the prestored digital images are selected in accordance with a particular design attribute or style that complements the overall aesthetic appearance of the captured customer generated image.

The present invention solves the foregoing problem by providing a system where the customer generated image is scanned and a particular design attribute and/or style is determined. Then a prestored image is automatically selected which has a complementary design attribute and/or style.

SUMMARY OF THE INVENTION

In accordance with one aspect of the present invention there is provided a method of combining at least one captured generated digital image with at least one prestored digital image, comprising the steps of:

a) analyzing the customer generated digital image so as to obtain a design attribute and/or style;

b) automatically selecting a prestored digital image in accordance with the design attribute and/or style obtained;

c) combining the customer generated image and the selected prestored digital image so as to form a merged image; and d) forwarding the merged image to an output device.

In accordance with another aspect of the present invention there is provided a method of combining at least one captured generated digital image with at least one prestored digital image, comprising the steps of:

a) providing at least one capture means for obtaining a customer generated image in digital form;

b) selecting a design attribute and/or style;

c) automatically selecting a prestored digital image in accordance with the selected design attribute and/or style;

d) combining said customer generated image and said selected prestored digital image so as to form a merged image; and e) forwarding said merged image to an output device.

DESCRIPTION OF THE DRAWINGS

The file of this patent contains at least one drawing executed in color. Copies of this patent with color drawing(s) win be provided by the Patent and Trademark Office upon request and payment of the necessary fee.

In the detailed description of the preferred embodiment of the invention presented below, reference is made to the accompanying drawings, in which.

DETAILED DESCRIPTION OF THE INVENTION

Figure 1:
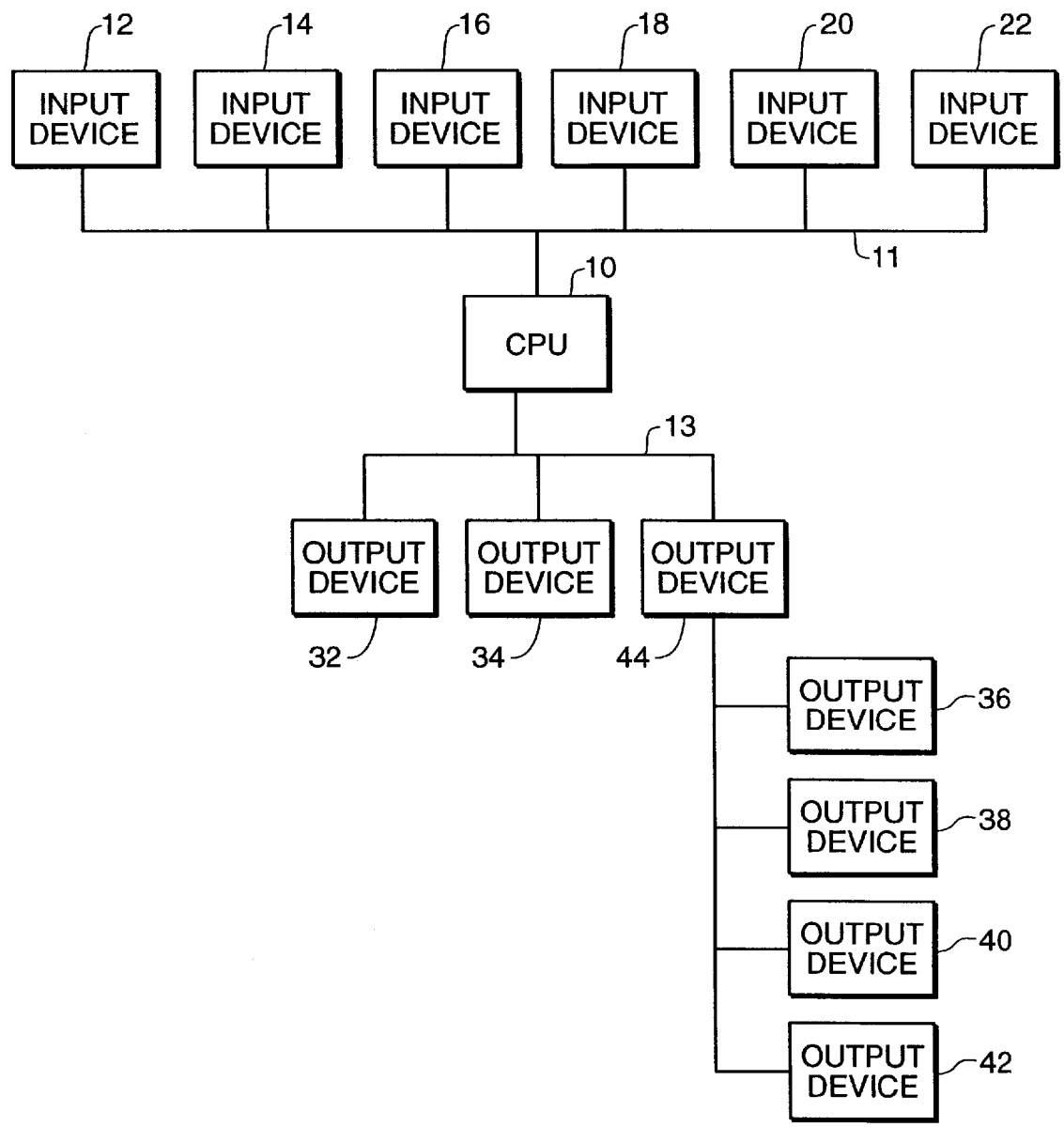
FIG. 1 is a schematic block diagram of a system made in accordance with the present invention.

Referring to FIG. 1, there is illustrated in block diagram form, a system for producing customized images and imprinting these customized images onto a variety of different formats. In particular, the system includes a central processing unit (CPU) 10 which can take the form of any appropriate computer. In the particular embodiment illustrated, the central processing unit 10 comprises an Apple Macintosh Computer which is used to control the various input and output devices. A plurality of input devices 12,14,16,18,20,22 are provided for generating an image in a digital format. In particular, first input device 12 comprises a scanner used to scan photographic negatives or slides, both color and monochrome. In the particular embodiment illustrated, the input device 12 comprises a Rapid Film Scanner 2035, made by the Eastman Kodak Company. The input device 12 scans the film and produces a digital output which is forwarded onto the central processing unit 10 by an appropriate data link system 11 for storage in memory and further manipulation. Likewise, input device 14 is provided for scanning of photographic pictures, printed or drawn, both color and/or monochrome, and producing a digitized signal which is representing the image scanned. The Kodak Image Magic Heavy Stock Printer, sold by the Eastman Kodak Company, has a scanner built therein which is capable of scanning photographic pictures, or any type printed material, and providing the appropriate digital signal for the computer 10. The second input device 14 is appropriately connected to the CPU 10 such that the CPU 10 may appropriately receive and manipulate the information obtained therefrom. Likewise, input devices 16,18,20,22 are provided for obtaining digital signals representative of an image from various sources. In particular, input device 16 is a video camera (where the output is digitized), and input device 18 comprises a CD (compact disc) reader for reading digitally stored information on a compact disc. Input device 20 comprises an electronic camera such as the DCS 200 Digital Camera, produced by the Eastman Kodak Company. Input device 22 may be any other input device which is capable of providing a digital signal representative of an image to the CPU, for example, video tape or video laser disc.

The CPU 10 is also connected to a variety of output devices 32,34,36,38,40,42. These output devices are all appropriately connected to the central processing unit 10 by an appropriate data link system 13 as is well known in the prior art. For example, but not by way of limitation, by an Ethernet data link system. The output device 32, for instance, comprises an electrophotographic printer such as the Coloredge Printer, sold by the Eastman Kodak Company, which takes the digital image and transfers the image onto media which can then be used to produce transfers for use on garments. The output device 34 in the embodiment illustrated is a cathode-ray tube printer (CRT), in particular, the PCD 600 Printer, produced by the Eastman Kodak Company, which takes an image that is displayed on a cathode-ray tube and focuses it onto a photographic paper. Also provided is a thermal printer 36 for printing images onto thermal media. An example of a suitable thermal printer is the XLS 8600 Digital Thermal Color Printer, sold by the Eastman Kodak Company. In particular, printer 38 can be a thermal printer for providing transfers for use on T-shirts, whereas thermal printer 40 can be used for providing transfers for placement on mugs. The last output device 42 illustrated is an inkjet printer which can be used to imprint the merged image on greeting cards and the like. Various other devices may be provided for transferring onto various other formats such as garments, mugs, posters, banners, life-size cut-outs, holographic and 3-D imaging, balloons, pens, and pencils.

In the preferred embodiment illustrated, a server 44, such as the Power PC Apple Macintosh Computer, is used for managing information from the CPU 10 and for appropriately providing information to the various printing devices associated therewith. Likewise, if so desired, additional computers may be provided in association with each of the input or output devices for managing information and providing further customizing features as deemed appropriate. For a more simplified system, the input and output devices may all be connected to a single computer. Also, it is to be understood that any type suitable printing device may be employed for producing the image in the desired format, the present invention not being limited by the printing devices described herein.

Is to be understood that the CPU 10 may be provided with a monitor for viewing various screens for indicating the status of the system and available options for controlling and/or operating the system as is customarily done in the prior art. The CPU 10 is also provided with an appropriate input device such as a keyboard, touchscreen, or pointing device, as are well known in the prior art, for allowing the operator to properly operate the system. Thus, the user, which may be the operator and/or customer, can also view the various images being input into the system and generated by the system so that the appropriate selections can be made by the user and/or customer. In the CPU there is stored a plurality of prestored images which may comprise a variety of artistic themes having at least one location for receiving a customer generated digital image. Any one of these prestored images may be selected and digitally merged with the customer generated image(s) captured by any of the input devices 12,14,16,16,20,22.

A more detailed description of the operation of the system disclosed in FIG. 1 is described in U.S. Pat. No. 5,459,819, which is hereby incorporated by reference in its entirety.

Figure 2:
FIG. 2 illustrates an example of a prestored image having a single location for receiving a customer generated digital image, the prestored image having a particular design attribute.
Figure 4:
FIG. 4 is a customer generated digital image to be merged into the prestored image of FIG. 2 or 3.

Referring to FIG. 2, there is illustrated a first digital prestored image (PSI) 100 that has been stored in the CPU 10. The prestored image 100 has at least location 102 where a customer generated digital image (CGI) 110 (as shown in FIG. 4) can be placed. In the embodiment illustrated, prestored image 100 is a colored matte having a wood grain appearance. As can be seen, prestored image 100 has a predetermined design attribute and/or style. In particular, prestored image 100 has a generally horizontal directionality to the matte 103.

Figure 3:
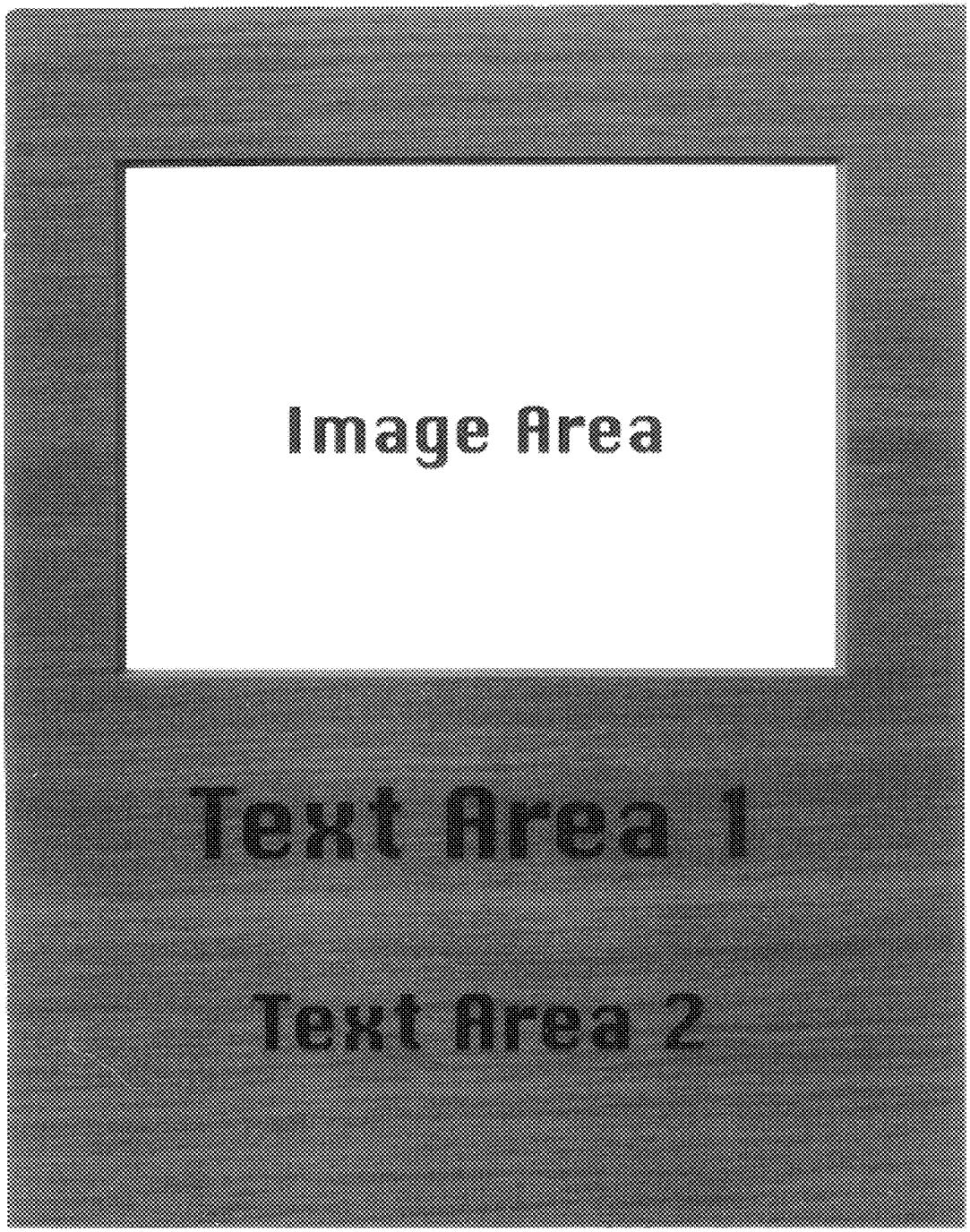
FIG. 3 illustrates an example of a second prestored image having single location for receiving a customer generated digital image, the second prestored image having a second design attribute.

Referring to FIG. 3, there is illustrated a second digital prestored image 112 having a location 104 where a customer generated image 110 can be placed. Prestored image 112 is also a colored matte 115 similar to that of prestored image 100, except that image 112 has a different design attribute/style. In particular, image 112 has a generally vertical overall design attribute.

The digital prestored images 100,112, shown in FIGS. 2 and 3, also include two text areas for the addition of text if so desired. It is, of course, to be understood that any desired number of locations for customer generated images and text may be provided as desired.

Referring to FIG. 4, there is illustrated a customer generated image 110 which is to be merged with a prestored image. Since the image 110 has been captured in a digital format, it can be analyzed for various design and/or style attributes. For example, the image can be analyzed for a particular characteristic, such as directionality.

Figure 5:
FIG. 5 is a view similar to FIG. 4 illustrating the design attribute of the digital image.
Figure 6:
FIG. 6 illustrates the merging of the image of FIG. 3 with the prestored image of FIG. 4.

Referring to FIG. 5, there is illustrated an augmented visual representation of the vertically dominated directionality of the image 110. The CPU 10, through the use of rite software, can analyze the digital representation of image 110 to obtain a value for a particular style or design attribute. For example, vector analysis, as is well known in the art, can be used to determine the directionality of the image. The result of this analysis produces a value which is compared to the directionality values of various prestored digital images (previously obtained and stored in memory) whereby the computer will automatically select the prestored images having the closest or dominate corresponding value in accordance with predetermined parameters. For example, since the customer generated image 110 has a generally vertical directionality, the computer would automatically select the prestored digital image 100 as opposed to prestored digital image 112. Therefore, the customer generated image 110 would be merged with image 100 to produce the merged image 120 illustrated in FIG. 6. As a result of merging a customer generated image 110 with a prestored image having a design attribute that is complementary to the customer generated image, a merged image is provided that is aesthetically pleasing.

Figure 7:
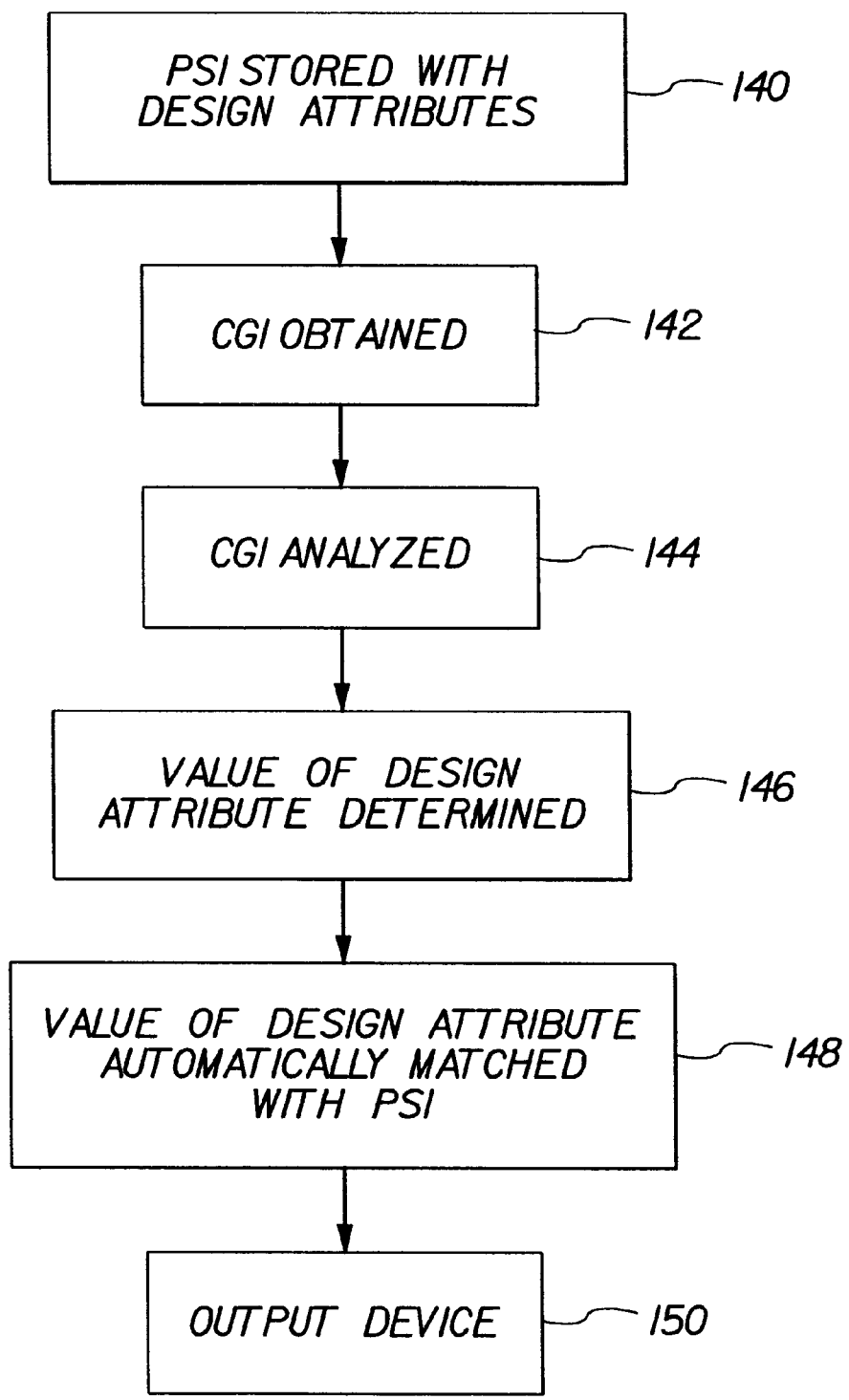
FIG. 7 is a flow chart illustrating the method according to the present invention.

Referring to FIG. 7, there is a flow chart on the method of producing a merged image according to the present invention. First, as indicated by step 140, a number of prestored images are provided and various design attributes are determined for each and are stored in memory. Then, at step 142, a customer generated digital image (CGI) is obtained by any of the appropriate input devices. The CGI, at step 144, is analyzed for one or more designed attributes as selected by the customer. At step 146, value of the dominating design attribute or attributes is determined. This value is compared by the CPU 10 with the values of the same design attribute for the prestored images and are matched within predetermined matching criteria. The CPU 10 then automatically selects the appropriate prestored image and merges it with the CGI at step 148. If desired, the merged image may be viewed on an appropriate display device, such as a CRT, to confirm the appropriateness of the combination. Thereafter, the merged image is sent to an appropriate output device for producing the merged image at step 150.

In the foregoing embodiment, the CGI is analyzed and matched in accordance with preprogrammed criteria. Alternatively, instead of analyzing the CGI, the customer may select a desired design attribute which is to be automatically matched by the CPU in accordance with criteria selected by the customer.

While in the particular embodiment illustrated directionality of the customer generated image and prestored image are determined and matched, various other design attributes or styles of the images may be associated together. For example, but not by way of limitation, color tone, color balance, background pattern, large or small design images, etc.

It is also to be understood that various other changes and modifications may be made without departing from the scope of the present invention, the present invention being defined by the claims that follow.

Parts List

10 . . . central processing unit
11,13 . . . data link system
12,14,16,18,20,22 . . . input devices
32,34,36,38,40,42 . . . output devices
44 . . . server
100,112 . . . first digital prestored image
102,104 . . . location
103 . . . matte
110 . . . customer generated digital image
115 . . . colored matte
120 . . . merged image
140,142,144,146,148,150 . . . step

What is claimed is:

1. A method of combining at least one captured generated digital image with at least one prestored digital image, comprising the steps of:
   a) providing at least one capture means for obtaining a customer generated image in digital form;
   b) analyzing said customer generated digital image so as to obtain a design attribute and/or style of said customer generated digital image;
   c) comparing the obtained design attribute and/or style of the customer generated digital image with design attributes and/or style of prestored digital images;
   d) automatically selecting a prestored digital image which has a design attribute and/or style that matches the obtained design attribute and/or style of the customer generated digital image;
   e) combining said customer generated image and said selected prestored digital image so as to form a merged image; and
   f) forwarding said merged image to an output device.

2. The method according to claim 1 wherein said design attribute comprises an overall color balance.

3. The method according to claim 1 wherein said design attribute comprises a background pattern.

4. The method according to claim 1 wherein said design attribute comprises a directionality.

5. The method according to claim 1, wherein said obtained attribute and/or style of said customer generated digital image is a dominant design attribute and/or style.

6. A method of combining at least one captured generated digital image with at least one prestored digital image, comprising the steps of:
   a) analyzing said customer generated digital image so as to obtain a design attribute and/or style;
   b) comparing the obtained design attribute and/or style of the customer generated digital image with design attributes and/or style of prestored digital images;
   c) automatically selecting a prestored digital image which has a design attribute and/or style that matches the obtained design attribute and/or style of the customer generated image;
   d) combining said customer generated image and said selected prestored digital image so as to form a merged image; and
   e) forwarding said merged image to an output device.

7. The method according to claim 6 wherein said design attribute comprises an overall color balance.

8. The method according to claim 6 wherein said design attribute comprises a background pattern.

9. The method according to claim 6 wherein said design attribute comprises a directionality.

10. The method according to claim 6, wherein said obtained attribute and/or style of said customer generated digital image is a dominant design attribute and/or style.

11. A method of combining at least one captured generated digital image with at least one prestored digital image, comprising the steps of:
   a) providing at least one capture means for obtaining a customer generated image in digital form;
   b) selecting a design attribute and/or style of said customer generated image;
   c) comparing the selected design attribute and/or style of said customer generated image with design attributes and/or style of prestored digital images;
   d) automatically selecting a prestored digital image which has a design attribute and/or style that matches the selected design attribute and/or style;
   e) combining said customer generated image and said selected prestored digital image so as to form a merged image; and
   f) forwarding said merged image to an output device.

12. The method according to claim 11 wherein said design attribute comprises an overall color balance.

13. The method according to claim 11 wherein said design attribute comprises a background pattern.

14. The method according to claim 11 wherein said design attribute comprises a directionality.

15. The method according to claim 11, wherein said selected attribute and/or style of said customer generated image is a dominant design attribute and/or style.

* * * * *